United States Patent [19]

Hultsch et al.

[11] 4,320,007

[45] Mar. 16, 1982

[54] PUSHER-TYPE CENTRIFUGE FILTERS

[75] Inventors: Günther Hultsch, Oberschleissheim; Helmut Wilkesmann, Munich, both of Fed. Rep. of Germany

[73] Assignee: Krauss-Maffei Aktiengesellschaft, Munich, Fed. Rep. of Germany

[21] Appl. No.: 127,115

[22] Filed: Mar. 4, 1980

[30] Foreign Application Priority Data

Mar. 13, 1979 [DE] Fed. Rep. of Germany ....... 2909716

[51] Int. Cl.[3] .............................................. B01D 33/10

[52] U.S. Cl. .................................................... 210/376

[58] Field of Search ............................ 233/3; 210/376

[56] References Cited

U.S. PATENT DOCUMENTS

| | | | |
|---|---|---|---|
| 1,382,142 | 6/1921 | Sturgeon | 233/3 |
| 3,368,684 | 2/1968 | Ruegg | 210/376 |
| 3,409,137 | 11/1968 | Schneider | 210/376 |
| 3,415,446 | 12/1968 | Weiland | 233/20 |
| 3,463,318 | 8/1969 | Lutter | 210/376 |
| 3,585,132 | 10/1969 | Ruegg | 210/376 |
| 3,966,117 | 6/1976 | Johannes | 233/3 |
| 4,073,731 | 2/1978 | Fanta | 210/376 |
| 4,209,405 | 6/1980 | Christ | 210/376 |
| 4,217,226 | 8/1980 | Kampeon et al. | 210/376 |

FOREIGN PATENT DOCUMENTS

| | | |
|---|---|---|
| 625067 | 10/1934 | Fed. Rep. of Germany . |
| 648087 | 7/1937 | Fed. Rep. of Germany . |
| 220555 | 4/1942 | Fed. Rep. of Germany . |
| 27446 | 3/1964 | Fed. Rep. of Germany . |
| 2220718 | 4/1972 | Fed. Rep. of Germany . |
| 2508017 | 9/1976 | Fed. Rep. of Germany . |
| 2521838 | 11/1976 | Fed. Rep. of Germany . |
| 2538630 | 10/1977 | Fed. Rep. of Germany . |
| 887232 | 11/1943 | France . |
| 963524 | 7/1950 | France . |

*Primary Examiner*—Theodore A. Granger
*Attorney, Agent, or Firm*—Karl F. Ross

[57] ABSTRACT

A centrifuge filter has a sieve drum normally rotated about its axis and normally fed internally with a filtrand that is separated when the drum rotates into solids lying on the inner surface of the drum and a filtrate that passes radially outwardly through the drum. A pusher plate is axially displaceable in the drum and has an outer edge closely juxtaposed with the drum's inner surface so that it can scrape solids from the surface. A cylinder is rotationally fixed to the drum and has a cylinder chamber that is axially subdivided by a piston into a front compartment and a rear compartment. This piston is jointly axially displaceable with the pusher plate and is axially biased backward. A liquid is introduced into one compartment to fill it as it rotates so that the liquid will be forced radially outward by centrifugal force and will urge the piston axially forward. This liquid is periodically drained off so that the force it exerts is less than that of the biasing means. In this manner the piston will move back and forth each time the rear compartment is filled and drained.

10 Claims, 3 Drawing Figures

PUSHER-TYPE CENTRIFUGE FILTERS

FIELD OF THE INVENTION

Our present invention relates to a pusher-type centrifuge filter. More particularly this invention concerns such a filter that operates continuously to separate a filtrand into a filtrate and solids, with automatic scraping of the filter cake formed by the solids from the filter medium.

BACKGROUND OF THE INVENTION

A known drum-type centrifuge filter has a sieve drum rotatable about an axis and an inner sieve surface normally formed by a filter medium, the interior of the drum constituting an axially forwardly open sieve chamber. A filtrand is fed into the sieve chamber while the drum is rotated about its axis so as to centrifugally separate the filtrand into solids lying on the sieve surface and a liquid phase that is radially discharged through a perforated peripheral wall of the drum.

In order to clear the sieve chamber of solids retained by the filter medium inside the drum, a pusher plate is provided which is axially displaceable in the drum between a rear end position and a front end position. This pusher plate has an outer edge closely juxtaposed with the inner surface of the peripheral drum wall so that the plate, on moving axially from its rear position to its front position, scrapes the solids from the filter medium and thrusts them forward out of the chamber. Normally the pusher plate is operated by a piston mounted in a cylinder that is rotationally fixed to the drum and forms a cylinder chamber which is centered on its axis but is axially offset from the sieve chamber. The piston axially subdivides this cylinder chamber into a pair of compartments.

The filter-cake solids are scraped from the inner sieve surface by pressurizing the rear compartment between the piston and a wall of the cylinder so as to move the pusher plate forward. The pusher plate is then returned to its rest or rear position by pressurizing the front compartment. This operation normally takes place while the filtrand is continuously fed into the device which continues to rotate.

Oil is fed to the two chambers through a bearing that axially fits on the shaft of the drum and communicates through axial passages in the shaft with respective radial passages opening into the cylinder compartments. A simple reversing valve fills one compartment while emptying the other for the above-described axial reciprocation of the piston with the pusher plate.

Since a substantial axial force must be exerted by the pusher plate in order to scrape the solids from the inner drum surface, the oil must be introduced under considerable pressure, so that high-quality seals must be provided for the piston and the various connections. Moreover, it is normally necessary to provide a cooling device for the oil which becomes hot during use. Thus, such an arrangement is extremely expensing and, owing to its complexity, failure-prone.

Various drum centrifuges of the above-described general type are described in U.S. Pat. Nos. 1,382,142 and 3,415,446, as well as in French Pat. Nos. 887,232 and 963,142 respectively dated Oct. 22, 1942 and Mar. 22, 1948. Others are described in Swiss Pat. No. 220,555 of Apr. 15, 1942 and in East German Pat. No. 27,446 of Mar. 5, 1964; see also West German Pat. Nos. 625,067, 648,087, 2,220,718, 2,508,017, 2,521,838 and 2,538,630.

OBJECTS OF THE INVENTION

It is therefore an object of the present invention to provide an improved pusher-type centrifuge filter.

Another object is to provide such a centrifuge filter wherein the mechanism for pushing out the cake-forming solids is substantially simpler than that used hitherto.

SUMMARY OF THE INVENTION

These objects are attained according to the instant invention in a centrifuge filter of the above-described general type wherein the pusher plate and the piston are jointly urged axially rearward by biasing means in a first cylinder compartment proximal to the drum so as to reduce the axial length of a second cylinder compartment remote from the drum. We also provide inlet means for introducing a working liquid under substantially atmospheric pressure into the latter compartment during rotation of the cylinder whereby this liquid will be radially accelerated by a centrifugal force to exert upon the piston a counteracting pressure overcoming the force of the biasing means. We further provide intermittently effective exhaust means for periodically draining enough working liquid from the second compartment so as to decrease the counteracting pressure which the liquid exerts on the piston in a forward direction whereby the biasing means will restore the piston to a rearward position previously occupied. Thus the piston will periodically move back and forth and will synchronously axially reciprocate the pusher plate to periodically scrape the filter medium on the inner peripheral surface of the drum.

Thus according to the instant invention the entire oil-pumping system used in the prior-art system is eliminated. Instead the piston is urged axially in one direction by a body of liquid which is pressurized purely centrifugally so that as it attempts to expand outward it exerts an axial component of force on the piston. In this manner it is possible to exert a considerable axial force on the piston. This axial force is directly proportional to the centrifugal force which increases with the square of the tangential velocity of the rotating annulus of working liquid such as water in the second compartment, so that is is apparent that considerable forces can be brought to bear to scrape off filtered-out solids. The drum of the apparatus embodying our invention is normally driven by a motor which is substantially overdimensioned for its task. According to this invention the motor itself indirectly provides the force to axially displace the piston. We may also use part of the filtrate as the working liquid as will be described hereinafter.

The intermittently effective exhaust means may comprise a valve member linked with the piston by a lost-motion coupling so as to unblock an outlet for the working liquid present in the second compartment upon axial forward entrainment as the piston moves into its forward position.

Alternatively, the exhaust means can be constituted as an L-shaped drain tube, traversing a central opening in an annular rear wall of the second compartment, whose intake end can be dipped into the annulus of liquid that will form in that compartment as the cylinder is rotated. This drain tube can be continuously rotated about a line parallel to the axis of the drum so that it periodically scoops up some of the working liquid.

The biasing means according to this invention may be one or more springs braced axially between the piston and a wall of the cylinder closing the rear end of the drum. The biasing means may also be constituted as a conduit for introducing some of the filtrate into the second compartment so that the biasing force itself increases with the rotational speed of the filter. The last-described arrangement allows the device to be in balance at virtually any angular speed.

Thus with the system of our invention it is possible to eliminate the expensive and trouble-prone hydraulic piston-actuating system, as well as its complex control circuitry. The system according to the instant invention will operate automatically to reciprocate the pusher plate in the drum so as to keep it clean. The filter can also be operated continuously and can be counted on to have a long service life.

BRIEF DESCRIPTION OF THE DRAWING

The above and other features of our invention will now be described in detail with reference to the accompanying drawing in which.

SPECIFIC DESCRIPTION

Figures 1, 1A:
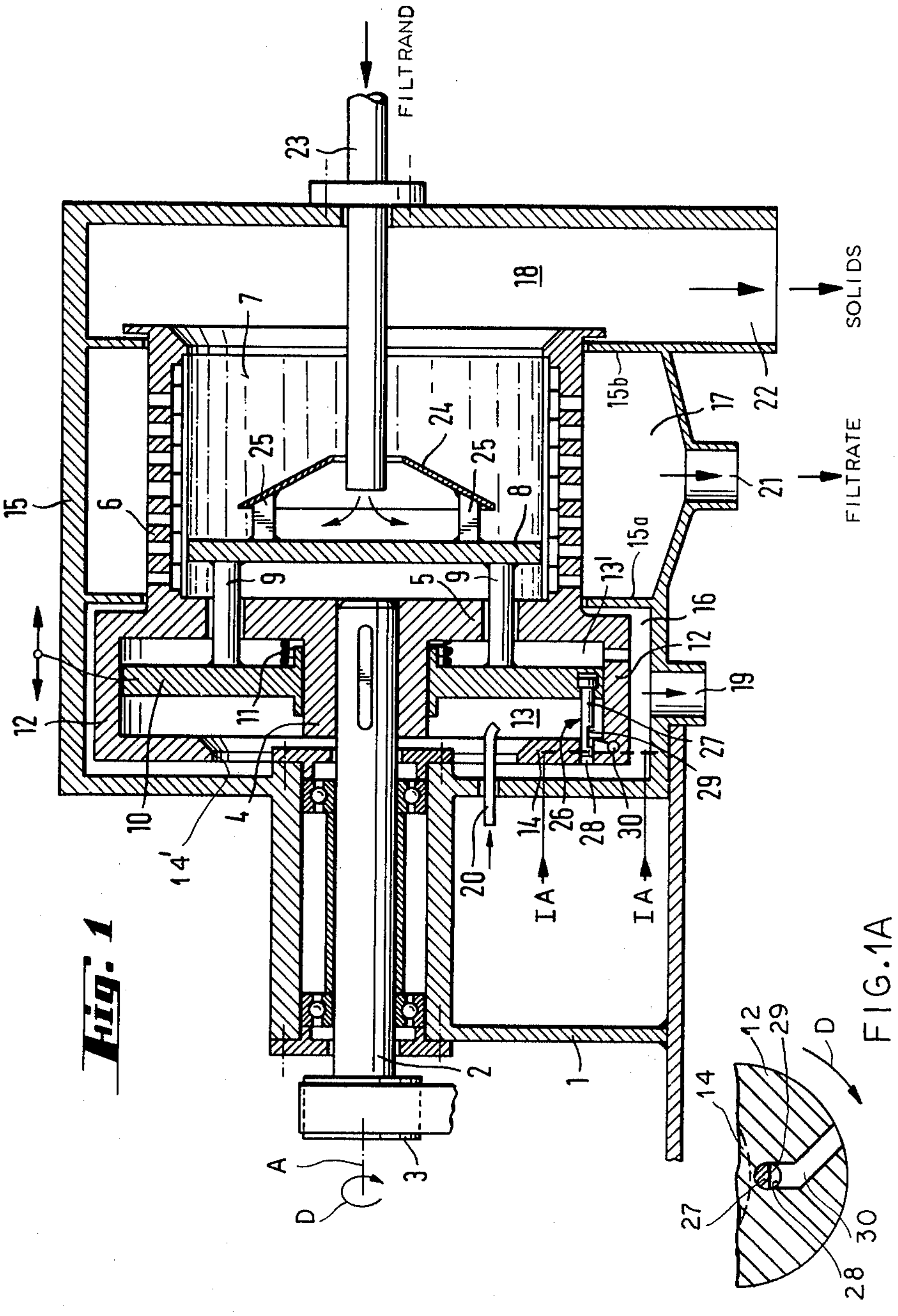
FIG. 1 is an axial section through an apparatus according to this invention.
FIG. 1A is a section taken along line IA—IA of FIG. 1.

As seen in FIG. 1, a filter centrifuge according to the instant invention has a support 1 in which a horizontal shaft 2 is journaled for rotation about an axis A by drive means including a pulley 3. This shaft 2 carries a hub 4 from which radially extends an end wall 5 of a cylindrical perforate drum 6 provided with an inner sieve surface 7 constituted by a filter medium. A pusher plate 8 lying like end wall 5 in a plane perpendicular to the axis A is connected, via a plurality of rods 9 that extend axially through wall 5, with an annular piston 10 that is urged axially backward, toward the left in FIG. 1, by a compression spring 11; piston 10 subdivides a cylinder 12, integral with the end wall 5, into a back compartment 13 and a front compartment 13′. The cylinder 12 has an annular rear wall 14 forming a central opening 14′ so that the compartment 13 is always at ambient pressure.

The filter centrifuge has a housing 15 subdivided by transverse partitions 15*a*, 15*b* into a rear chamber 16 surrounding this cylinder 12, an intermediate annular chamber 17 surrounding the perforated portion of the drum 6, and a front chamber 18 into which the drum 6 opens forwardly. The rear compartment 16 has a radially downwardly open drain hole 19, and a fixed inlet tube 20 extends axially from the rear through chamber 16 and opening 14′ into the annular compartment 13. The chamber 17 has a radially downwardly open drain hole 21 from which filtrate exits during the operation of the machine. Finally the front compartment 18 has a downwardly radially opening outlet 22 from which solids fall on being pushed out of the drum as will be described below.

Filtrand, that is a suspension of solid particles in a liquid to be recovered at 21, is introduced into the interior of the drum 6 by an axially extending feed tube 23 whose discharge end lies between the inner and outer peripheries of a spreader frustocone 24 that is axially centered and forwardly tapered. Distributing struts 25 support this frustocone 24 with an axial spacing forwardly of the pusher plate 8 so that this frustocone 24 rotates jointly with the pusher plate 8 and, therefore, with the piston 10 and drum 6.

The piston 10 operates a valve 26 with a valve rod 27 having a front end received with limited axial play in the piston 10 and a rear end received in an axially throughgoing hole 28 in the wall 14. This rear end is formed with a notch 29 which can be aligned with a passage 30 that opens radially inwardly into the hole 28 and is outwardly slanted against the direction of rotation D as seen in FIG. 1A.

During normal operation a motor rotates the drive pulley 3 so as jointly to rotate the drum 6, pusher plate 8, cylinder 12, and piston 10 in the direction D. Meanwhile a filtrand is fed into the tube 23 and is distributed radially outward by the spreader cone 24. The solids come to lie on the sieve surface 7 and the liquid fraction, that is the filtrate, passes radially out through the perforated peripheral wall of drum 6 and exits via the drain 21. During this operation the piston 10 is axially repressed by spring 11 in the cylinder 12 so that the compartment 13 is of minimum volume, the compartment 13′ is of maximum volume, and the pusher plate 8 lies against the front face of the end wall 5 of the drum 6.

Meanwhile a working liquid is continuously introduced into the compartment 13 by the inlet tube 20. As the annulus of liquid inside the rotating compartment 13 becomes radially deeper, its pressure increases directly with the centrifugal force exerted onto it. Since only the piston 10 can move, eventually this force will be sufficient to overcome the axially backwardly effective force of the spring 11 to urge the piston 10 axially forward, i.e. to the right in FIG. 1. This will have the effect of scraping the interior of the drum 6 with the outer peripheral edge of the plate 8. This all occurs while the tube 23 continues to introduce filtrand into the drum 6.

Finally the notch 29 of the valve rod 27 will be pulled over the passage 30 so that liquid will be able to exit radially through this passage 30. The rate of outflow will be high so that this compartment 13 will empty very rapidly. Normally it will be able to empty completely before the piston 10 has time to move back and overcome the lost motion at the loose front end at the rod 27 to entrain that rod and block off the passage 30. The liquid also flows out at a rate many times greater than that at which it is introduced via the tube 20 so that the plate 10 will return under the force of the spring 11 to its axially retracted position. Meanwhile the liquid exiting from the outer end of the passage 30 will have a jet action to rotationally drive the cylinder 12 and, with it, the drum 6. In this manner only a small portion of the energy in the system is actually lost.

Once the piston 10 returns back far enough to close the valve 26 it will start another cycle as described above.

Figure 2:
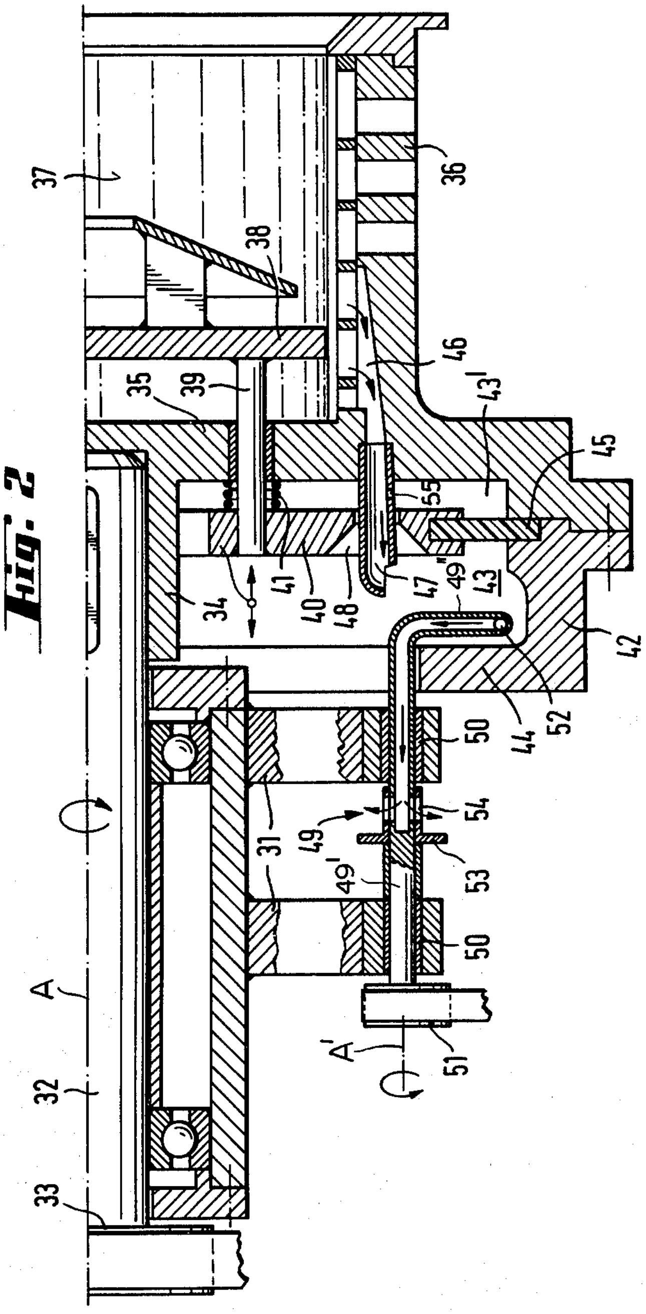
FIG. 2 is a partial axial section through another apparatus according to this invention.

The arrangement of FIG. 2 is similar to that of FIG. 1, but here a support 31 carries a shaft 32 that is driven by a pulley 33 and has a hub 34 from which an end wall 35 of a drum 36 radially extends. A pusher plate 38 can axially reciprocate along an inner sieve surface 37 of this drum 36 and is connected via rods 39 to a piston 40 that is urged axially back by compression springs 41 surrounding the rods 39. A cylinder 42 surrounds this piston 40 which subdivides the interior of this cylinder 42 into a rear compartment 43 and a front compartment 43′, with an annular rear wall 44 forming the back edge of the rear compartment 43.

In this arrangement the piston 40 has an outer diameter substantially smaller than the inner diameter of the cylinder 42 and is sealed with respect to the cylinder 42 by a flexible annular synthetic-resin membrane 45 whose outer periphery is clamped between sections of the cylinder 42 and whose inner periphery is fitted in a groove of the outer periphery of the piston 40. The drum 36 itself is formed outside the filter medium 37 with a plurality of passages 46 that communicate with inlet tubes 47 passing through axial bores 48 of the piston 40. The rear ends of these tubes 47 therefore open into the compartment 43.

The compartment 43' can be pressurized also by the filtrate which can exit through small apertures 55 in the tubes 47 so that a small portion of the filtrate going through the apertured sections of these tubes 47 can fill the front compartment 43'. Thus the axially backwardly effective biasing force will be at least partly proportional to the angular speed of the assembly. The springs 41 could be eliminated with this arrangement.

The compartment 43 is drained by means of an L-shaped tube 49 carried in bearings 50 on the support 31 and connected at one end to a drive means constituted in part by a pulley 51. This tube 49 is shown to have a longer leg 49', which is centered on a line A', parallel to the axis A, and a shorter leg 49'' which extends radially of the leg 49' and has an intake end 52 facing against the direction of rotation of the liquid in the compartment 43. The axially extending leg 49' is largely solid, is fitted with a spray ring 53 and is formed with holes 54 through which the scooped-up liquid can escape into the housing compartment (not shown) surrounding the cylinder 42.

The drive pulley 51 continuously rotates the tube 49 about the centerline A' of the leg 49' so as periodically to dip the intake end 52 of the leg 49' into the liquid in the compartment 43. Obviously each time this end 52 dips into the liquid in the compartment 43 much of this liquid will rapidly exit from the compartment 43, thereby decreasing the axially forwardly effective force on the piston 40 so that the latter will reciprocate at a rate that is exactly equal to the RPM of the tube 49.

The advantage of the system of FIG. 2 is that it allows the reciprocation rate to be controlled relatively easily, and without a supply of fresh liquid. Of course the filtrate issuing from the holes 54 can be captured so as not to be wasted.

In a standard prior-art system approximately 40% of the energy employed is used for the oil pump that operates the pusher plate. In a system as shown in FIG. 2 about 50% of the filtrate, which is about 25% of the suspension or filtrand fed in, is rotated some 10% faster. This operation employs only about 5% more energy than is normally used to drive the centrifuge rotor, which amounts overall to about 3–4% of the energy used by the entire system. Thus the instant invention entails an important energy saving.

We claim:

1. A centrifuge filter comprising:

a sieve drum rotatable about an axis and having an inner surface forming an axially forwardly open sieve chamber;

means for feeding a filtrand into said sieve chamber;

means for rotating said drum about said axis and thereby centrifugally separating said filtrand into solids lying on said sieve surface and a filtrate passing radially outwardly through said drum;

a pusher plate axially displaceable in said drum between a rear end position and a front end position and having an outer edge closely juxtaposed with said surface, whereby axial forward displacement of said plate from said rear position to said front position scrapes said solids from said surface and pushes said solids forward in said chamber;

a cylinder rotationally fixed to said drum and forming a cylinder chamber centered on said axis and axially offset from said sieve chamber;

a piston axially subdividing said cylinder chamber into a front compartment and a rear compartment while being jointly axially displaceable with said pusher plate;

biasing means for urging said pusher plate and said piston jointly axially in one direction for reducing the axial length of one of said compartments and increasing the axial length of the other of said compartments, said one compartment being open and always substantially at ambient pressure;

means including a conduit extending from radially outside said surface of said drum into said one compartment for continuously introducing said filtrate into said one compartment and thereby filling same, whereby on rotation of said cylinder said liquid filtrate in said one compartment will be forced radially outwardly and will urge said piston axially in the direction opposite said one direction; and means for periodically draining said filtrate from said one compartment and thereby decreasing the force said filtrate exerts on said piston in said opposite direction to less than the force said biasing means exerts on said piston in said one direction, whereby said piston will periodically move back and forth and will similarly axially reciprocate said pusher plate to periodically scrape said surface of said drum.

2. A centrifuge filter as defined in claim 1 wherein said conduit extends through said piston.

3. A centrifuge filter as defined in claim 2 wherein said piston includes a membrane having an outer periphery sealingly attached to said cylinder.

4. A centrifuge filter comprising:

a housing subdivided by internal partitions into a rear chamber, an intermediate chamber and a front chamber;

a sieve drum in said housing rotatable about an axis generally perpendicular to said partitions, said drum having a perforated peripheral wall connecting the interior thereof with said intermediate chamber, said peripheral wall being internally lined with a filter medium, said interior being open at one end toward said front chamber and being closed at the opposite end by a coaxial cylinder rigid with said peripheral wall and located in said rear chamber, said drum being further provided with an axially extending shaft journaled in said housing;

drive means coupled with said shaft for setting said drum in rotation;

a piston axially reciprocable in said cylinder, said piston subdividing said cylinder into a first compartment proximal to said drum and a second compartment remote from said drum;

feed means entering said drum for filling the interior thereof with a filtrand having a liquid phase which during rotation exits as a filtrate through said peripheral wall into said intermediate chamber while leaving solids retained by said filter medium in said drum;

biasing means in said first compartment urging said piston rearward;

inlet means entering said second compartment for admitting a working liquid into same under substantially atmospheric pressure during rotation of said drum whereby said working liquid is radially accelerated by a centrifugal force to exert upon said piston a counteracting pressure overcoming the force of said biasing means with resulting forward displacement of said piston;

intermittently effective exhaust means in said second compartment for periodically draining enough working liquid therefrom to let said biasing means restore said piston to a rearward position; and a pusher plate transverse to said axis disposed in the interior of said drum and positively linked with said piston for joint reciprocation therewith, said pusher plate having a peripheral edge close to said filter medium for scraping off retained solids and thrusting same toward said front chamber.

5. A centrifuge filter as defined in claim 4 wherein said second compartment is bounded by an annular rear wall with a central opening through which said second compartment communicates with said rear chamber.

6. A centrifuge filter as defined in claim 5 wherein said inlet means comprises a tube entering said second compartment through said central opening.

7. A centrifuge filter as defined in claim 5 wherein said exhaust means comprises an L-shaped tube extending into said second compartment through said central opening, said tube having one leg centered on a line parallel to said axis and another leg transverse thereto with an intake opening at a free end thereof, said exhaust means further comprising a mechanism for rotating said tube about said line whereby said intake opening periodically scoops up working liquid from said second compartment.

8. A centrifuge filter as defined in claim 4, 5, or 6 wherein said exhaust means comprises a valve member linked with said piston by a lost-motion coupling for axial entrainment thereby, said valve member unblocking an outlet for said working liquid in a forward position thereof.

9. A centrifuge filter as defined in claim 4, 5 or 7 wherein said inlet means comprises a conduit extending from the peripheral drum wall through said piston into said second compartment for supplying same with filtrate passed by said filter medium.

10. A centrifuge filter as defined in claim 9 wherein said biasing means includes an apertured section of said conduit through which part of said filtrate enters said first compartment.

* * * * *